United States Patent [19]

Miyoshi et al.

[11] Patent Number: 4,652,958

[45] Date of Patent: Mar. 24, 1987

[54] TAPE FOR CLEANING MAGNETIC HEAD

[75] Inventors: Takahito Miyoshi; Akira Kasuga; Masaaki Fujiyama, all of Kanagawa, Japan

[73] Assignee: Fuji Photo Film Co., Ltd., Japan

[21] Appl. No.: 799,481

[22] Filed: Nov. 19, 1985

[30] Foreign Application Priority Data

Nov. 20, 1984 [JP] Japan ................... 59-245507

[51] Int. Cl.$^4$ ............................... G11B 5/41
[52] U.S. Cl. ............................... 360/128
[58] Field of Search ............................. 360/128

[56] References Cited

U.S. PATENT DOCUMENTS

| 3,978,520 | 8/1976 | Nowicki et al. | 360/128 |
| 4,138,229 | 2/1979 | Tadokoro et al. | 360/128 |
| 4,490,762 | 12/1984 | Akashi et al. | 360/128 |

FOREIGN PATENT DOCUMENTS

| 55-129925 | 10/1980 | Japan | 360/128 |
| 2078433 | 1/1982 | United Kingdom | 360/128 |

Primary Examiner—Robert S. Tupper
Attorney, Agent, or Firm—Ostrolenk, Faber, Gerb & Soffen

[57] ABSTRACT

A tape for cleaning magnetic head comprising a support and a cleaning layer coated on said support which contains an abrasive comprising a ferromagnetic metal powder of a specific surface area in the range of 40 to 65 m$^2$/g as a principal component, the surface of said cleaning layer having a surface of center line average height in the range of 0.02 to 0.04 μm at a cut-off value of 0.08 mm.

8 Claims, No Drawings

TAPE FOR CLEANING MAGNETIC HEAD

BACKGROUND OF THE INVENTION

1. Field of the Invention

The present invention relates to a tape for cleaning magnetic head of a magnetic recording and reproducing device in which a magnetic recording medium such as an audio tape or a video tape is utilized.

2. Description of Prior Arts

A magnetic recording medium (hereinafter referred to as magnetic tape) such as an audio tape, a video tape or a tape for computer system, comprises a non-magnetic support and a magnetic recording layer containing a ferromagnetic metal oxide powder in the form of needle crystals such as of $\gamma$-$Fe_2O_3$, Co-containing iron oxide or $CrO_2$ dispersed in a binder.

Recently, an 8 mm video tape has been developed, and as a result, more high density recording has became required. Accordingly, a magnetic tape containing a ferromagnetic metal powder which has a high coercive force (Hc) and a high residual flux density (Br) becomes more popular than the aforementioned tapes with metal oxide powders.

Further, the material of a magnetic head has been studied for improvement to meet the requirements in relation to the aforementioned development of a magnetic recording medium for high density recording. Thus, a magnetic head of an alloy material such as sendust becomes more popular than the conventional magnetic head of a ferrite material.

Especially as the material of magnetic head used in the 8 mm video recorder, an alloy such as sendust is now widely used for improving the reproduction output. Further, there is a special advantage with a magnetic head of this material; that is, a magnetic tape does not need to be placed under high pressure (the conventional magnetic head of ferrite-forming material needs to be placed under high pressure), whereby the deterioration of a magnetic tape caused by the contact with a running device is reduced.

With the combined use of a magnetic recording medium containing a ferromagnetic metal powder having a high coercive force and a magnetic head of a sendust composite type, it is now possible to fulfill the aforementioned requirements such as those required in the case using an 8 mm video tape system where high density recording and high reproduciton output are necessary.

Nevertheless, there is a problem in the use of a ferromagnetic metal powder. That is, since the ferromagnetic metal powder has a low hardness, the magnetic layer of the magnetic recording medium containing the metal powder does not show a sufficient durableness for running, and the a ferromagnetic metal powder readily drops out of the magnetic recording layer. The ferromagnetic metal powder dropped from the magnetic recording layer causes clogging on the magnetic head, which lowers the reproduction output.

Such clogging on the magnetic head is removed by running the so-called cleaning tape in contact with the surface of a magnetic head. The cleaning tape comprises a support and a cleaning layer containing an abrasive having high hardness. By the use of the cleaning tape, the stain on a magnetic head of a hard ferrite material can be eliminated effectively without damaging the magnetic head. However, a magnetic head of an alloy material such as sendust having a low hardness and a very smooth surface is readily injured by the contact of the conventional cleaning tape. The injured surface of a magnetic head causes noise generation and drop-out in the output process. Therefore, a new cleaning tape which solves this problem is required.

SUMMARY OF THE INVENTION

This invention has an object to provide a cleaning tape, namely, a tape for cleaning magnetic head, which can remove stains deposited on a magnetic head within a short period of time without damaging the magnetic head.

The invention particularly has an object to provide a cleaning tape which is advantageously employable for cleaning a magnetic head which is used in contact with a magnetic recording medium at a low contact pressure.

Further, the invention particularly has an object to provide a cleaning tape which is advantageously employable for cleaning a magnetic head having a low hardness, whereby removing stains deposited on the magnetic head within a short period of time without damaging the head.

The present invention resides in a tape for cleaning magnetic head comprising a support and a cleaning layer coated on said support which contains an abrasive comprising a ferromagnetic metal powder of a specific surface area in the range of 40 to 65 $m^2/g$ as a principal component, the surface of said cleaning layer having a surface of center line average height in the range of 0.02 to 0.04 $\mu m$ at a cut-off value of 0.08 mm.

The cleaning tape provided by the invention can efficiently remove stains deposited on a magnetic head within a short period of time without damaging the head.

Accordingly the cleaning tape of the invention is especially useful for cleaning a magnetic head of, for example, an 8 mm video tape recorder which is used in contact with a magnetic recording medium (e.g., magnetic tape) at a low contact pressure. Further, the cleaning tape of the invention can advantageously remove stains deposited on the magnetic head having a low hardness such as a magnetic head of sendust composite type within a short period of time without damaging the head.

DETAILED DESCRIPTION OF THE INVENTION

The cleaning tape of the invention comprises a support and a cleaning layer coated on said support which contains an abrasive dispersed in a binder.

A support generally used can also be employed as the support of the invention. The materials which can be used for the support are, for example, synthetic resin films (e.g. polyethylene terephthalate, polycarbonate, polyethylene naphthalate, polyamide, polyamideimide and polyimide) and metal foils (e.g. aluminum foil and stainless foil). The thickness of the support is generally in the range of 6 to 14 $\mu m$, preferably in the range of 7 to 12 $\mu m$ and more preferably in the range of 7 to 10 82 m. If the thickness of the support is less than 6 $\mu m$, the tape may not hold the sufficient durableness. If the thickness of the support is more than 14 $\mu m$, the tape may not closely come into contact with a magnetic head of a device (e.g. 8 mm video recording device) which is used at a relatively low tensile strength against the tape, and a poor cleaning may be given.

A backing layer is preferably provided to one side of the support where the cleaning layer is not coated. The backing layer generally used for a magnetic recording medium can also be used for this purpose. The backing layer comprises, for example, a resin film having a resin component such as polyurethane and other resin component such as a cellulose derivative and polyisocyanate and additives such as an antistatic agent, a lubricant and an abrasive. The provision of such backing layer is preferred, because the durableness of the tape is reinforced without lowering the close contact of the cleaning tape with a magentic head when the support is made very thin to come into close contact with the magnetic head.

Further, it is preferable to include carbon black powder in the back layer of the cleaning tape. Carbon black powder is effective as antistatic agent and prevents deposit of stains on the surface of a tape whereby reducing damage of a device (especially a running system such as a magnetic head). The kind and amount of carbon black powder to be added to the backing layer can be optionally selected on the basis of the conventional art for the backing layer attached to a video tape.

The cleaning tape of the invention comprises the above-described support and a cleaning layer coated on said support, the cleaning layer containing an abrasive which is dispersed in a binder.

The abrasive to be used in the cleaning tape of the invention includes a ferromagnetic metal powder whose specific surface area (S BET) is in the range of 40 to 65 $m^2/g$, preferably in the range of 45 to 60 $m^2/g$. If the specific surface area is less than 40 $m^2/g$ (namely, has too large average particle size), a magnetic head may be easily damaged while the cleaning procedure is performed. On the other hand, if the specific surface area is larger than 65 $m^2/g$ (namely, has too small average particle size), sufficient cleaning may not be performed, and the clogging on the magnetic head cannot be removed within a short period of time.

Further, the center line average height (Ra value) of the surface of the cleaning layer of the cleaning tape pf the invention needs to be in the range of 0.02 to 0.04 $\mu$m (at a cut-off value of 0.08 mm). A cleaning layer having a surface of an Ra value of less than 0.02 $\mu$m is too smooth to accomplish efficient cleaning, and the clogging on the magnetic head cannot be removed within a short period of time. On the other hand, a cleaning layer having an Ra value of greater than 0.04 $\mu$m is too rough to possibly damage the magnetic head.

The center line average height of the cleaning layer can be set to within the desired range by controlling the manufacturing process as described hereinafter, which may or may not include the calendering processing, or by controlling the temperature and pressure in the processing.

Further, by setting the center line average height within the above-mentioned range, separation of the cleaning layer is prevented.

As a ferromagnetic metal powder employed as abrasive in the cleaning layer, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, Fe-Zn-Ni or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powders are already known, and can be prepared by known methods.

For instance, a ferromagnetic alloy powder can be prepared by the following known processes.

(a) a process of reducing a double organic acid salt (typically, an oxalate) by a reducing gas such as hydrogen;

(b) a process of reducing a ferric oxide and/or other metal oxide by a reducing gas such as hydrogen to obtain Fe particle, Fe-Co particle, etc.;

(c) a process of thermally decomposing a metal carbonyl compound;

(d) a process of reducing a ferromagnetic metal in an aqueous solution in the presence of a reducing agent such as sodium borohydride, hypophosphite or hydrazine;

(e) a process of electrolyzing a ferromagnetic metal solution at mercury electrode and separating the deposited ferromagnetic metal powder from mercury; and (f) a process of evaporating a metal in an inert atmosphere under reduced pressure to obtain a fine powder.

The ferromagnetic metal powder generally is in any shape such as needle shape, grain shape, dice shape, rice shape or plate shape.

The ferromagnetic metal powder employed as abrasive in the cleaning tape of the invention preferably is in needle shape. A ferromagnetic metal powder of the needle shape preferably has an average longitudinal length ranging from 0.10 to 0.30 $\mu$m, more preferably from 0.15 to 0.25 $\mu$m, and an average width length ranging from 0.015 to 0.030, more preferably 0.020 to 0.025 $\mu$m. Such ferromagnetic metal powder is composed essentially of needle crystals having a longitudinal length in the range of 0.03 to 0.55 $\mu$m, particularly in the range of 0.07 to 0.47 $\mu$m, and a width length in the range of 0.010 to 0.045 $\mu$m, particularly 0.013 to 0.033 $\mu$m.

The abrasive of the cleaning tape of the invention, that is, the ferromagnetic metal powder, can be employed singly, but generally is employed in combination with other conventional abrasive, such as an abrasive having a Mohs' scale of hardness of not less than 6.

Examples of the conventional abrasive include $\alpha$-$Fe_2O_3$, SiC, $\alpha$-$Al_2O_3$ and $Cr_2O_3$.

The average particle size of the conventional abrasive preferably is more than 0.05 $\mu$m, preferably in the range of 0.05 to 0.5 $\mu$m, more preferably in the range of 0.1 to 0.5 $\mu$m.

The conventional abrasive can be incorporated into the magnetic recording layer in an amount of generally less than 10 parts by weight, preferably 2 to 8 parts by weight, based on 100 parts by weight of the ferromagnetic metal powder.

The binder employable in the formation of the cleaning layer of the invention can be chosen from known binder mateials.

Examples of the binder material employable in the formation of the cleaning layer include cellulose derivatives (e.g., nitrocellulose and cellulose acetate), vinyl chloride/vinyl acetate copolymer resins, (e.g., vinyl chloride/vinyl acetate copolymers, vinyl chrroride/vinyl acetate/vinylalcohol copolymers, and vinyl chloride/vinyl acetate/maleic acid anhydride copolymers), vinylidene chloride resins (e.g., vinylidene chloride/vinyl chloride copolymers and vinylidene chloride/acrylonitrile copolymers), polyester resins (e.g., alkyd resin and linear polyester), acrylic resins (e.g., acrylic acid/acrylonitrile copolymer and methyl acrylate/acrylonitrile copolymer), polyvinyl acetal resin, polyvinyl resin, phenoxy resin, epoxy resin, butadiene/acrylonitrile copolymer resin, polyurethane resin and urethane epoxy resin. Preferred are vinyl chloride/vinyl acetate/vinyl alcohol copolymers, vinyl chloride/vinyl acetate/maleic anhydride copolymers, and vinyl chloride/vinyl acetate/acrylic acid copolymers. Most preferred are vinyl chloride/vinyl acetate/maleic anhydride copolymers.

The amount of the binder is generally in the range of 0.2 to 10 parts by weight and preferably in the range of 3.3 to 6.6 parts by weight per 100 parts by weight of the ferromagnetic metal powder.

A magnetic recording medium of the invention can contain in the cleaning layer one or more organic or inorganic fillers which are known as fillers employed in a magnetic recording layer of a recording medium. The filler generally has an average particle size of 0.01 to 0.8 $\mu$m, preferably 0.06 to 0.4 $\mu$m. Examples of the filler include carbon black, graphite, tungsten disulfide, boron nitride, calcium carbonate, titanium dioxide, magnesium oxide, zinc oxide, calsium oxide, lithopon, and talc. The filler can be employed singly or in combination. Particularly, carbon black powder having an average particle size of 0.015 to 0.2 $\mu$m is preferred.

The filler generally is added in an amount of not more than 10 parts by weight based on 100 parts by weight of the ferromagnetic metal powder.

The cleaning tape of the invention can be produced by a process comprising the steps of first by preparing a coating dispersion containing the ferromagnetic metal powder, binder and optional additives such as other abrasive, dispersing agent, lubricant, stabilizer and antistatic agent in an organic solvent such as methyl ethyl ketone, or cyclohexane, then applying this dispersion onto a nonmagnetic support, upon which the dispersion is dried. Generally, a cleaning layer is formed by applying the coating dispersion directly on a nonmagnetic support, but it is also possible to provide an adhesive layer or a subbing layer between the cleaning layer and the nonmagnetic support.

The dispersing agent employable is, for example, a fatty acid having 12 to 22 carbon atoms (e.g., caprylic acid, capric acid, lauric acid, myristic acid, palmitic acid, stearic acid, oleic acid, elaidic acid, linoleic acid, linolenic acid; a soap of an alkali metal (e.g., lithium, sodium or potassium) or an alkaline earth metal (e.g., magnesium, calcium or barium) of the above-stated fatty acid; a fatty acid amide derived from the fatty acid, an aliphatic amine, a higher alcohol, a polyalkyleneoxide alkylphosphate ester, an alkylphosphate ester, an alkylborate ester, a sarcosinate, an alkyl ether esters, or other known disperser or surfactant such as a trialkyl-polyolefin quaternary ammonium salt and lecithin.

The lubricant is, for example, a fatty acid, a higher alcohol, a fatty acid ester of a monovalent fatty acid having 12 to 20 carbon atoms and a mono/polyhydric alcohol having 3 to 20 carbon atoms (e.g., butyl stearate or sorbitan oleate); a mineral oil, an animal or vegetable oil, an olefin polymer having a low molecular weight, an $\alpha$-olefin polymer having low molecular weight, or other known lubricant, for instance, for plastics (e.g., graphite powder, molybdenum disulfide powder or teflon powder).

The antistatic agent is, for example, a natural surfactant (e.g., saponin), a nonionic surfactant (e.g., of alkylenoxide type, of glycerol type, or of glycidol type), a cationic surfactant (e.g., higher alkylamine, quarternary ammonium salt, heterocyclic phosphonium compound such as pyridine or sulfonium compounds), an anionic surfactant (e.g., carboxylic acid, sulfonic acid, phosphate or compound having acid groups such as sulfuric ester-type or phosphoric ester type), and an amphoteric surfactant (e.g., amino acid, amino sulfonic acid, sulfuric or phosphoric ester of amino alcohol).

The procedure for preparing the dispersion for the formation of a cleaning layer as well as the procedure for coating the dispersion as such are known. Also known are other treating processes such as a drying process and a slitting process. Accordingly, there is no need to further give a detailed description thereon.

The cleaning layer preferably has a thickness (after dryness) of approx. 0.5 to 10 $\mu$m, more preferably approx. 1.5 to 7.0 $\mu$m.

Then the cleaning layer is generally so processed by callendering as to have a surface of center line average height in the range of 0.02 t0 0.04 $\mu$m at a cut-off value of 0.08 mm.

Thus processed tape is then slitted to have a desired size.

The cleaning tape of the invention can remove clogging on a magnetic head within a short period of time without damaging the head. The cleaning tape of the invention is especially suitable for cleaning a magnetic head of an alloy material having la ow hardness such as a sendust composite type head used for an 8 mm video recording system. Further, since the cleaning tape can be made very thin, the tape can run in contact with a magnetic head very closely and uniformly. Thus, cleaning can be performed effectively.

Further, the cleaning tape of the invention can be used effectively for a video tape recorder system for commercial use requiring high reproduction output such as one used in a broadcasting center.

Hereinbefore, the description of the cleaning tape is mainly given with respect to the application to an 8 mm video recording system, but the cleaning tape of the invention can also be applied to the conventional ½ inch video tape recording system.

Examples and comparison examples which illustrate the present invention are given in the following.

The term "part" used in the examples is used to mean "part by weight", unless otherwise specified.

The cleaning tape was evaluated in the examples in the following manner.

Several magnetic heads of sendust composite type having on their surfaces a certain amount of stains (clogging on a magnetic head) deposited by running an 8 mm video tape containing a ferromagnetic metal powder for the certain period of time were prepared. The cleaning tape to be tested was forced to run for 10 sec. on the surface of each magnetic head. The surface of each magnetic head was then observed.

EXAMPLE 1

The components indicated below were mixed to to give a dispersion.

Ferromagnetic alloy powder (Fe-Ni alloy Fe: approx. 95 wt.%, Ni: approx. 5 wt.% specific surface area (S-BET): 45 m$^2$/g average longitudinal length: 0.25 $\mu$m, average width length: 0.02 $\mu$m): 100 parts Vinyl chloride/vinyl acetate/maleic anhydride copolymer (400×110A, available from Japanese Geon Co., Ltd.): 11 parts Polyurethane resin (N-2301, available from Japan Polyurethane Co., Ltd.): 11 parts
Carbon black (mean particle size: 90 mμ): 1 part
α-Alumina (mean particle size: 300 mμ): 5 parts
Stearic acid: 1 part
Oleic acid: 1 part
Butyl stearate: 1 part
Methyl ethyl ketone: 500 parts To the above dispersion was added the following curing composition. The resulting mixture was kneaded to give a coating dispersion for the formation of a cleaning layer.

Polyisocyanate (Coronate L, available from Japane Polyurethane Co., Ltd.): 8 parts
Methyl ethyl ketone: 500 parts The resulting dispersion was coated on a polyethylene terephthalate support (thickness: 9 μm) to give a cleaning layer of 3.0 μm thick (thickness of dry film basis). On the reverse side of the support was coated the following dispersion for providing a backing layer of 0.8 μm thick (thickness of dry film basis).

Carbon black (means particle size: 50 mμ): 100 parts
Nitrocellulose: 60 parts
Polyurethane resin (N-2301, available from Japane Polyurethane Co., Ltd.): 60 parts
Polyisocyanate: 40 parts
Stearic acid: 1 part
$Cr_2O_3$: 1 part
Methyl ethyl ketone: 600 parts The coated layers were dried, and a calendering processing was applied to the cleaning layer so that the cleaning layer had a surface of center line average height 0.03 μm at a cut-off value of 0.08 mm.

The resulting sheet was slitted to give cleaning tapes for the 8 mm video system.

The obtained cleaning tape was run in contact with the magnetic head in the manner described previously. It was observed that the stains on the magnetic head (i.e., clogging on magnetic head) vanished completely. Further, no scratch was found on the magnetic head.

EXAMPLE 2

A cleaning tape for 8 mm video system was prepared in the same manner as in Example 1 except that the ferromagnetic alloy powder (S-BET: 45 m$^2$/g) was replaced with a ferromagnetic alloy powder of the same material having S-BET of 60 m$^2$/g.

The obtained cleaning tape was run in contact with the magnetic head in the manner described previously. It was observed that the stains on the magnetic head (i.e., clogging on magnetic head) vanished completely. Further, no scratch was found on the magnetic head.

Comparison Example 1

A cleaning tape for 8 mm video system was prepared in the same manner as in Example 1 except that the ferromagnetic alloy powder (S-BET: 45 m$^2$/g) was replaced with a ferromagnetic alloy powder of the same material having S-BET of 35 m$^2$/g.

The obtained cleaning tape was run in contact with the magnetic head in the manner described previously. It was observed that the stains on the magnetic head (i.e., clogging on magnetic head) vanished completely. However, some scratches were found on the magnetic head.

Comparison Example 2

A cleaning tape for 8 mm video system was prepared in the same manner as in Example 1 cexcept that the ferromagnetic alloy powder (S-BET: 45 m$^2$/g) was replaced with a ferromagnetic alloy powder of the same material having S-BET of 70 m$^2$/g.

The obtained cleaning tape was run in contact with the magnetic head in the manner described previously. It was observed that some stains on the magnetic head (i.e., clogging on magnetic head) remained.

The running of the cleaning tape was further continued, and as a result it was found that complete removal of the stains were achieved by the running for 20 sec. No scratch was found on the magnetic head.

Comparison Example 3

A cleaning tape for 8 mm video system was prepared in the same manner as in Example 1 except that the calendering was applied to the cleaning layer in such a manner as to give a surface of center line average height of 0.15 μm.

The obtained cleaning tape was run in contact with the magnetic head in the manner described previously. It was observed that some stains on the magnetic head (i.e., clogging on magnetic head) remained.

The running of the cleaning tape was further continued, and as a result it was found that complete removal of the stains were achieved by the running for 25 sec. No scratch was found on the magnetic head.

Comparison Example 4

A cleaning tape for 8 mm video system was prepared in the same manner as in Example 1 except that the calendering was applied to the cleaning layer in such a manner as to give a surface of center line average height of 0.15 μm.

The obtained cleaning tape was run in contact with the magnetic head in the manner described previously. It was observed that the stains on the magnetic head (i.e., clogging on magnetic head) vanished completely. However, some scratches were found on the magnetic head.

EXAMPLE 3

A cleaning tape for 8 mm video system was prepared in the same manner as in Example 1 except that a support of the same material having thickness of 6 μm was used.

The obtained cleaning tape was run in contact with the magnetic head in the manner described previously. It was observed that a small portion of the stains on the magnetic head (i.e., clogging on magnetic head) remained.

The running of the cleaning tape was further continued, and as a result it was found that complete removal of the stains were achieved by the running for 17 sec. No scratch was found on the magnetic head.

EXAMPLE 4

A cleaning tape for 8 mm video system was prepared in the same manner as in Example 1 except that a support of the same material having a thickness of 14 μm was used.

The obtained cleaning tape was run in contact with the magnetic head in the manner described previously. It was observed that a small portion of the stains on the magnetic head (i.e., clogging on magnetic head) remained.

The running of the cleaning tape was further continued, and as a result it was found that complete removal of the stains were achieved by the running for 17 sec. No scratch was found on the magnetic head.

EXAMPLE 5

A cleaning tape for 8 mm video system was prepared in the same manner as in Example 1 except that the backing layer was not provided.

The obtained cleaning tape was run in contact with the magnetic head in the manner described previously. It was observed that a small portion of the stains on the magnetic head (i.e., clogging on magnetic head) remained.

The running of the cleaning tape was further continued, and as a result it was found that complete removal of the stains were achieved by the running for 17 sec. No scratch was found on the magnetic head.

Comparison Example 5

A cleaning tape for 8 mm video system was prepared in the same manner as in Example 1 except that the ferromagnetic alloy powder (S-BET: 45 m$^2$/g) was replaced with a ferromagnetic Co-containing γ-iron oxide powder having S-BET of 45 m$^2$/g.

The obtained cleaning tape was run in contact with the magnetic head in the manner described previously. It was observed that a small portion of the stains on the magnetic head (i.e., clogging on magnetic head) remained The running of the cleaning tape was further continued, and as a result it was found that complete removal of the stains were achieved by the running for 15 sec. A great number of scratches were found on the magnetic head, but abrasion of the magnetic head was low.

Comparison Example 6

A cleaning tape for 8 mm video system was prepared in the same manner as in Example 1 except that 100 parts of the ferromagnetic alloy powder was replaced with 100 parts of α-alumina powder (average particle size: 0.5 μm) and that the calendering was applied to the cleaning layer in such a manner as to give a surface of center line average height of 0.05 μm.

The obtained cleaning tape was run in contact with the magnetic head in the manner described previously. It was observed that a small portion of the stains on the magnetic head (i.e., clogging on magnetic head) remained.

The running of the cleaning tape was further continued, and as a result it was found that complete removal of the stains were achieved by the running for 17 sec. A great number of scratches were found on the magnetic head, and high abrasion of the magnetic head was noted.

The results given in the above-described Examples and Comparison Examples show the following.

A cleaning tape using, as a principal abrasive component, a ferromagnetic metal powder having a so small average particle size as S-BET of around 70 m$^2$/g is not effective to remove efficiently the clogging on the magnetic head, though it gives no damage to the magentic head. In contrast, a cleaning tape using, as a principal abrasive component, a ferromagnetic metal powder having a so great average particle size as S-BET of around 35 m$^2$/g is effective to remove efficiently the clogging on the magnetic head, though it gives damage to the magentic head.

On the other hand, a cleaning tape having a cleaning layer in which Ra value is so small as around 0.015 μm is not effective to remove efficiently the clogging on the magnetic head, though it gives no damage to the magentic head. In contrast, a cleaning tape is having a cleaning layer in which Ra value is so great as around 0.05 μm effective to remove efficiently the clogging on the magnetic head, though it gives damage to the magentic head.

It has been further confirmed that a cleaning tape using, as a principal abrasive component, the conventional abrasive such as Co-containing γ-iron oxide or α-alumina easily damages a magnetic head of a relatively soft material.

Further, the provision of a backing layer is effective to enhance the cleaning ability of the cleaning tape.

What is claimed is:

1. A tape for cleaning magnetic head comprising a support and a cleaning layer coated on said support which contains an abrasive comprising a ferromagnetic metal powder of a specific surface area in the range of 40 to 65 m$^2$/g as a principal component, the surface of said cleaning layer having a surface of center line average height in the range of 0.02 to 0.04 μm at a cut-off value of 0.08 mm.

2. The tape as claimed in claim 1, wherein the thickness of said support is in the range of 6 to 14 μm.

3. The tape as claimed in claim 2, wherein the thickness of said support is in the range of 7 to 12 μm.

4. The tape as claimed in claim 1, wherein the thickness of said cleaning layer is in the range of 0.5 to 10 μm.

5. The tape as claimed in claim 1, wherein said cleaning layer contains an inorganic abrasive other than the the ferrromagnetic metal powder.

6. The tape as claimed in claim 5, wherein said cleaning layer contains 10% by weight of the inorganic abrasive pern the weight of ferromagnetic metal powder.

7. The tape as claimed in any one of claims 1 to 6, wherein a backing layer is provided to a surface of said support on the side where said cleaning layer is not provided.

8. The tape as claimed in claim 7, wherein said backing layer contains carbon black powder.

* * * * *